(12) United States Patent
Bucknell

(10) Patent No.: US 6,494,465 B1
(45) Date of Patent: Dec. 17, 2002

(54) SEALS FOR HYDRAULIC ASSEMBLIES

(76) Inventor: John Wentworth Bucknell, 21 Jenkinson Street, Indooroopilly, Queensland 4068 (AU)

( * ) Notice: Subject to any disclaimer, the term of this patent is extended or adjusted under 35 U.S.C. 154(b) by 0 days.

(21) Appl. No.: 09/214,553

(22) PCT Filed: Jul. 2, 1997

(86) PCT No.: PCT/AU97/00425

§ 371 (c)(1),
(2), (4) Date: Jan. 4, 1999

(87) PCT Pub. No.: WO98/00660

PCT Pub. Date: Jan. 8, 1998

(30) Foreign Application Priority Data

Jul. 2, 1996 (AU) ................................................ PO0765

(51) Int. Cl.$^7$ ................................................ F16J 15/02
(52) U.S. Cl. ........................ 277/641; 277/649; 277/653; 277/558; 277/587; 277/943
(58) Field of Search .................. 277/644, 647, 277/648, 649, 653, 943, 939, 558, 559, 587, 439

(56) References Cited

U.S. PATENT DOCUMENTS

| | | | | |
|---|---|---|---|---|
| 2,427,789 A | * | 9/1947 | Kehle |
| 2,733,969 A | * | 2/1956 | Polk |
| 3,033,597 A | * | 5/1962 | Miller |
| 3,090,630 A | * | 5/1963 | Gasche |
| 3,154,006 A | * | 10/1964 | Novak |
| 3,514,115 A | * | 5/1970 | Gallo |
| 3,841,193 A | * | 10/1974 | Ito |
| 3,860,271 A | * | 1/1975 | Rodgers |
| 3,953,213 A | * | 4/1976 | Gasper |
| 4,243,433 A | * | 1/1981 | Arai |
| 4,281,580 A | * | 8/1981 | Bunyan |
| 4,326,826 A | * | 4/1982 | Bunyan |
| 4,739,997 A | * | 4/1988 | Smetana |
| 4,854,798 A | * | 8/1989 | Snyder et al. |
| 5,468,106 A | * | 11/1995 | Percival-Smith |
| 5,518,255 A | * | 5/1996 | Seike et al. |
| 5,730,569 A | * | 3/1998 | Bucknell |

FOREIGN PATENT DOCUMENTS

| | | | |
|---|---|---|---|
| DE | 2455788 | * | 8/1976 |
| DE | 3130760 | * | 2/1983 |
| EP | 0129440 | * | 12/1984 |
| GB | 991783 | * | 5/1965 |
| GB | 2012392 | * | 7/1979 |
| GB | 2190439 | * | 11/1987 |
| GB | 2236372 | * | 4/1991 |

* cited by examiner

*Primary Examiner*—Anthony Knight
*Assistant Examiner*—Alison K. Pickard
(74) *Attorney, Agent, or Firm*—Dennis H. Lambert

(57) ABSTRACT

A seal for hydraulic assemblies operating at high temperatures having adaptations (19, 20, 49, 50) for low pressures sealing and configured to move across the gap to be sealed at higher pressures with an angled base on a slope (23, 44) or a cup shape (73, 74) nested into a groove (72). The seal at the point of the gap being an elastic, metallic material.

13 Claims, 7 Drawing Sheets

SEALS FOR HYDRAULIC ASSEMBLIES

TECHNICAL FIELD OF THE INVENTION

THIS INVENTION relates to improvements in hydraulic mechanisms such as fasteners or nuts and in particular it relates to improvements in the seals to such mechanisms and fasteners.

BACKGROUND ART

Hydraulic systems such as nuts and like type fasteners are known, The nuts provide a means by which a stud or bolt can be tensioned on being engaged by the nut, which nut is then hydraulically actuated to apply a tensile force in the stud or bolt. The nuts often operate under extremes of pressure and temperature.

Hydraulic nuts or like type fasteners are typically pretensioned mechanically, after which a source of hydraulic pressure is applied to a chamber within the structure to generate an hydraulic force which applies an axial tensile force to a stud or nut engaged by the fastener. A locking collar may be used to retain that tension after release of the pressure from said chamber.

The magnitude of the added tensile force is dependent upon the operative surface area of the hydraulic chamber in the nut and that pressure which is introduced into the chamber and acts upon it. Often the available operative surface area of the hydraulic chamber is limited by the juxtaposition of adjoining features and the necessary thickness of its internal structure to withstand stresses generated by the introduced fluid pressure. In such cases a stacked array of chambers may be utilised (see U.S. Pat No.4,326,826—Bunyan)

The expansion chambers of the above style nuts need to be sealed. In some assemblies pressurising fluid is retained within a bladder (see U.S. Pat. No. 4,854,798—Snyder). Most often seals are annular rings (see U.S. Pat. No. 4,074,923—Lathara).

Seals for use with high pressure hydraulic devices are typically made of elastomeric material such as nitrite rubber or polyurethane. The means by which these seal against the passage of fluid pressure can be divided into two distinct parts or mechanisms, described herein as primary and secondary mechanisms. The primary mechanism of sealing acts during the initial application of fluid pressure, and simply blocks the passage of fluid, allowing internal pressure to rise. As this pressure increases, the elastomeric seal is is deformed and is forced to a position where the seal bridges the gap which is to be sealed, herein referred to as the extrusion gap, to establish a secondary seal.

Prior art document U.S. Pat. No. 5,468,106 Percival-Smith shows seals, supposedly for Operation at higher temperatures than is achieved by conventional seals. Its seals are integrated with components of the hydraulic assembly and these are therefore non replaceable. Sealing is accomplished by deflecting a thin edge of a component to bridge the extrusion gap. A very rapid surge of viscous fluid is required to displace this edge.

It is typical of hydraulically activated piston and cylinder arrangements that as operating pressures increase, the cylinder walls are expanded radially, causing a proportional increase in the extrusion gap between piston and cylinder. This is particularly a feature of the above stacked configuration (Bunyan). Stacking is effected because of limitations to radial dimensions and the walls of such nuts are limited as to thickness. The walls of these nuts are particularly subject to increase in size of the extrusion gap as pressures are increased. There is a need for a seal which is re-usably operative in these and other systems, and at high temperature and pressures. The design of Percival-smith does not achieve good low pressure performance and it does not offer a useful re-usable seal.

A limiting feature in the operation of hydraulic nuts is the effectiveness of their seals. Factors such as high pressures, high temperatures, and service life under adverse conditions curtail their application and effectiveness. If these factors become extreme, either singly or in combination, then materials which are commonly used as sealing agents will fail. A failure mode is the flow or movement of the material of the seal into the extrusion gap under pressure and/or temperature. At this point the seal can be lost.

Object of the Invention

It is an object of the present invention to provide an hydraulic assembly, such as a fastener, with improved sealing characteristics able to tolerate more extreme factors such as high pressures and high temperatures, achieving a more extended service life under such adverse conditions.

Nature of the Invention

The invention achieves its object in the provision of a seal for an hydraulic assembly wherein hydraulic fluid is to be contained in a working chamber formed between at least two parts of the assembly operating in at least two modes, a primary sealing mode and a secondary sealing mode, the primary sealing mode being operative to contain hydraulic fluid to a first pressure level, and the secondary sealing mode being operative above said first pressure level with elastic deformation of a metallic part of the seal to closely associate the seal material with any gap between the at least two parts of the assembly.

The seal of the invention is particularly suited to applications where there is a substantial extrusion gap increase with applied pressure. The seal of the invention travels with the outer wall. It does not separate from it. The shoulder of the seal maintains a sliding contact with the radially expanding component of the assembly.

In a preferred embodiment the seal may be one which provides secondary sealing off sloped shoulders, a resolved force along the slope creating the secondary mode of sealing. The slope and material may be matched to achieve secondary sealing without the down force causing the seal base to adhere under friction to the ramp before the seal can react. The specific nature of a desirable seal is a combination of factors involving angle of slope, choice of material, target temperatures, and target pressures, such that no one design is forced for any particular application.

In a further and different embodiment the seal may be one wherein it is a pressed, cup shaped form, with flanges to form primary seats, and reactive to pressure to form a secondary seal. The cup form can be filled with materials with resistance to crushing such as ceramics.

Ideally the seal of the invention is one wherein dissimilar metals are chosen for the seal and the hydraulic assembly components being sealed, to avoid fusing at extreme pressures.

It will be evident that an adaptation of the hydraulic assembly, mechanism, or fastener, at the point where seals are fitted to the expansion chamber, will be made to accommodate the selected shape of the seal. A sloped shoulder will be effective in promotion of the secondary mode of sealing. A slope sufficient to enhance operation without inhibiting interaction between the respective surfaces of shoulder and seal is desirable. It will be clear to those skilled in the art that surface preparation will be important to establishing what level of interaction might arise between two such surfaces, in addition to choice of material, and geometry of the interacting surfaces. Various combinations of the aforesaid factors will provide increased radial thrust, to improve secondary sealing, in any given assembly. A desired thrust is resolved from that action of hydraulic forces directly on an angled base of the seal. Ramp angle for the base is ideally calculated to both prevent frictional adhesion of the seal to the romp before it can react, or wedging of the seal resulting impediment to free movement of the sliding components.

A number of seal constructions will be seen herein to be possible. The seal may be a one piece all metal seal, having both primary and secondary sealing functions. Alternately a one piece metal seal might be a pressed, cup shaped seal with flanges to form primary seals, reactive to pressure to form a secondary seal. Other materials with resistance to crushing might be used such as ceramics.

The yield strength of the materials used is desirably in excess of the sum of pressure and radial loads induced by operation, for repeated operation. Otherwise the seal may be limited to a single use. Below the yield strength the rings will possess elastic properties, permitting re-use for a longer service life and durability.

Whilst the invention is described herein with particular reference to hydraulic nuts, the seals of the invention have application in any hydraulic assembly where there is a working chamber to be operated, in use, under pressure of an hydraulic fluid, and it is desired to achieve a higher level of performance, at higher temperatures and pressures.

BRIEF DESCRIPTION OF THE DRAWINGS

The invention will now be described with reference to various specific embodiments of the invention, as shown in the accompanying drawings wherein.

PREFERRED EMBODIMENTS

Figure 1:
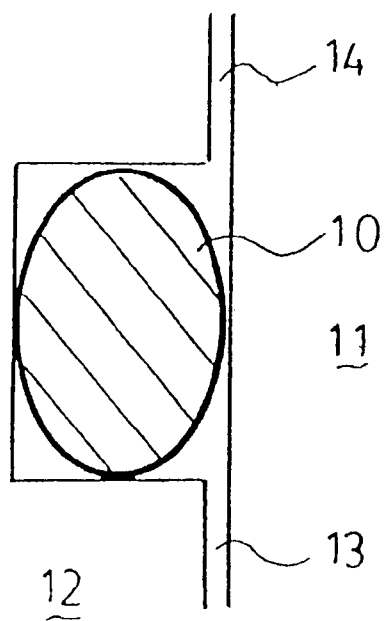
FIGS. 1 to 3 are transverse sectional views through prior art seals illustrating the manner of operation of such seals as are common to hydraulic nuts.

In FIG. 1 is seen a prior art interference type seal between two parts 11 and 12. The gap 13 is sealed against fluid under pressure in gap 14. This is referred to heroin as the Primary Sealing Mechanism.

The Primary Sealing Mechanism allows seal media to exert a light pressure against opposing surfaces to prevent passage of pressurizing fluid at low pressures yet allowing easy sliding contact between components. As the pressure increases, the force directed against the surface of the seal acts to deform the shape of the seal. This causes a transition of the actual point of contact at which sealing occurs from the low pressure point of contact to that area immediately adjacent the extrusion gap. At such time the seal material can be said to act simply as a barrier or plug to prevent loss of pressurizing fluid through the extrusion gap. This effect is herein described as the Secondary Sealing Mechanism.

Figure 2:
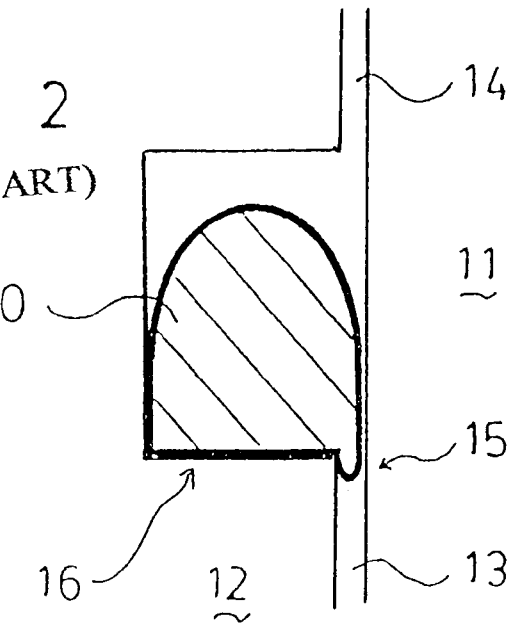

FIG. 2 shows the shape ultimately adopted by the seal under increased pressure. The material of the seal 10 is flattened against shoulder 16 and is squeezed over or into gap 13 at 1 5 to effect the Secondary Sealing Mechanism. At such times should pressures and/or temperatures rise, the usual materials employed in the seal 10 will eventually extrude into and through the extrusion gap and the seal will become ineffective or fail totally.

Figure 3:
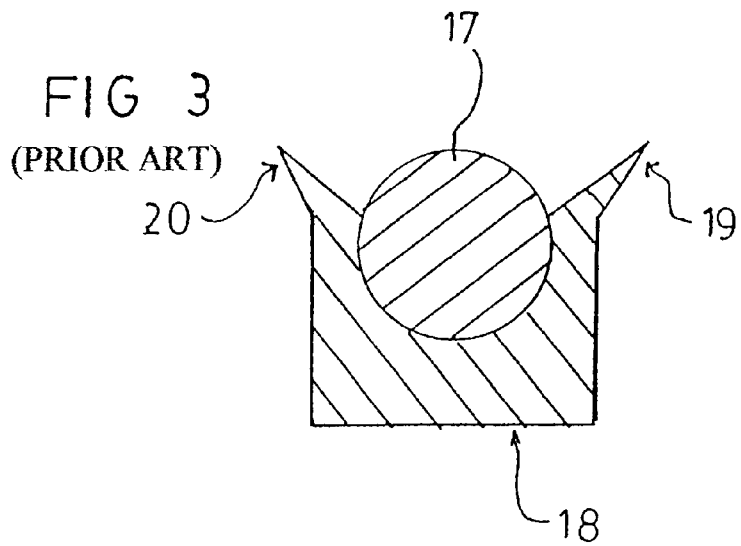

In FIG. 3 is seen a prior art composite seal 18 with a seal expander 17 and sealing lips 19 and 20 to effect an interference contact. In operation these act as the primary seal and the base of the seal 18 forms an extrusion barrier or secondary seat in use, akin to that of FIGS. 1 and 2 above. This form of seal will fail at higher pressures and temperatures depending on the choice of materials by extrusion at the gap as described above.

Figure 4:
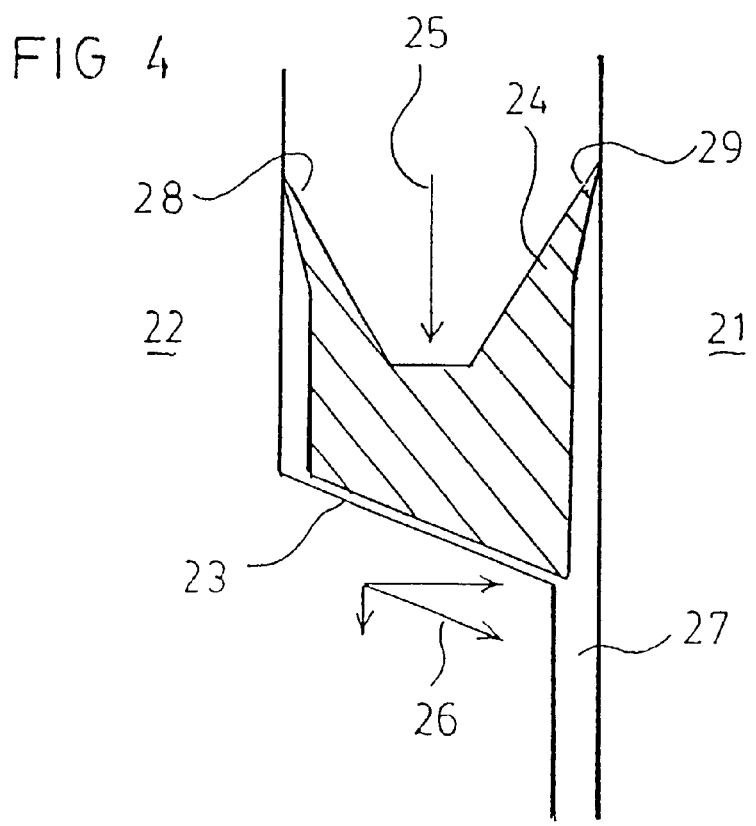
FIG. 4 is a cross-section through a seal and elements of a nut being sealed, showing details of a first embodiment of the present invention.

In FIG. 4 is seen a section through a seal 24 in accordance with the invention applied between components 21 and 22 which are acted on by hydraulic pressure in use, with a shoulder 23 supporting seal 24 which is angled as shown towards extrusion gap 27. The primary seal is via the upwardly tapered, outwardly acting extensions, or lips 28 and 29. The seal may be provided with a variety of geometries at this point to achieve a primary seal, with shoulders, flanges, protrusions, lips, etc., acting outwardly against the adjoining surface it is to seal against. During the application of fluid pressure over the seal, seal 24 is subject to an applied force thereby which produces a translated force 26 over the slope of shoulder 23, with a horizontally resolved vector or component thereof actioning, forcing or driving the seal, expanding or extending it over the gap 27, against the wall of component 21. This provides an improved secondary seal in accordance with the invention.

As seen in FIGS. 4 to 12, this principle may be applied to seals having a variety of different shapes, constructions, and/or materials. Both primary and secondary seals are produced. The seals utilise a vector component of the applied force to press the seal radially outwards against the wall of the cylinder. FIG. 13 shows an arrangement in which an annular seal, cup shaped in section, existing either singly or in multiples, may variously make primary and secondary seals in similar fashion to that described previously. The sectional shape of such seal components may be other than what is illustrated, for example, a V-form.

Ideally the secondary seal involves metal to metal contact. These seals are ideally formed in materials or combinations of materials so as to be reusable, or replaceable.

There are a number of ways in which the primary sealing effect can be generated as seen in FIGS. 4 to 12 (described in greater detail below).

When the seal acts on an angled shoulder, the angle of the base of the seal, and corresponding angle of the shoulder, is critical in providing radial thrust against the respective wall against which the seal is to act. The optimum angle is determined by factors including operating pressure, width and composition of seal and nut which determine the co-efficient of friction between the sliding surfaces. Ideal thrust force develops pressure of the seal against the cylinder wall, which together with that acting on the angled shoulder, resists the passage of pressurised fluid between these elements. The optimum configuration of these elements is that which effectively seals without exerting an excessive amount of force of the seal against the cylinder wall, which would cause sticking friction, and go thence galling of the surfaces.

Figure 5:
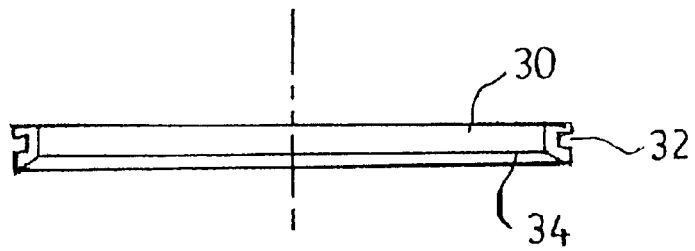
FIGS. 5 and 6 are sectional, segmental views of further sealing rings in accordance with the invention.
Figure 6:
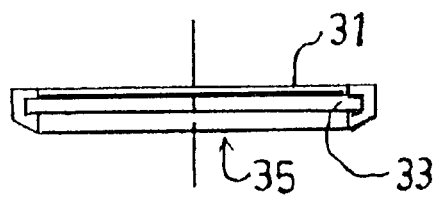

In FIGS. 5 and 6 are seen sections of sealing rings 30 and 31 which can have an O-ring type seal added to respective grooves 32 and 33 (one acting radially outwardly, the other radially inwardly) over an angled lower surface 34 and 35. The O-rings and corresponding O-rings in the nut components form the primary seal. As pressure is increased, the resolved force pushes the base outwardly (ring 30) or inwardly (ring 31) to form a secondary seal.

Figure 7:
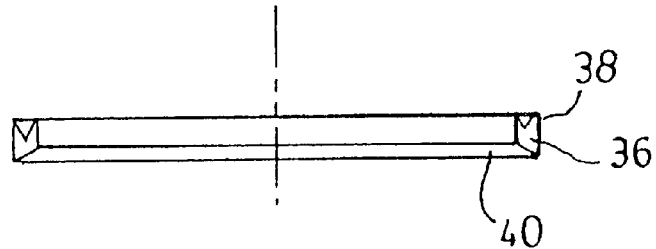
FIGS. 7 and 8 are still further sectional views showing additional types of sealing rings in accordance with the invention,*
Figure 8:
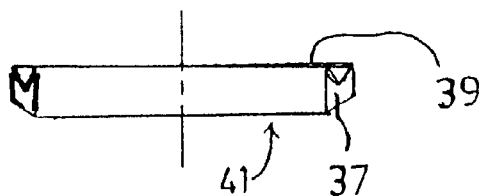

In FIGS. 7 and 8 are seen sections of sealing rings 36 and 37 which have a thin upper section 38, 39 respectively, which can deflect to give primary sealing at low pressures. The angled bases establish the secondary seals.

Figure 9:
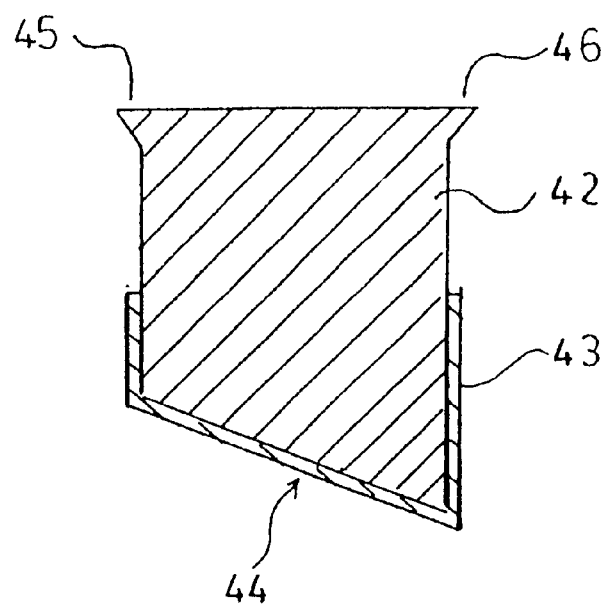
FIG. 9 is a transverse sectional view through a composite style sealing ring made in accordance with the invention.

In FIG. 9 is a composite seal formed in two parts, in two materials, preferably polyurethane 42 with a steel backing 43. The steel backing 43 is a shell with an angled base (oriented outwardly in this case but it could be reversed). The steel backing may be pressed to shape or machined from preferred materials for the application. The polyurethane insert 42 may have tapered extensions or lips 45 and 46. It forms the primary seal and deflects under pressure to force the shell 43, as described above, to bridge the extrusion gap and establish the secondary sealing. It might be used for temperatures up to 120° C. and/or high working pressures.

Figure 10:
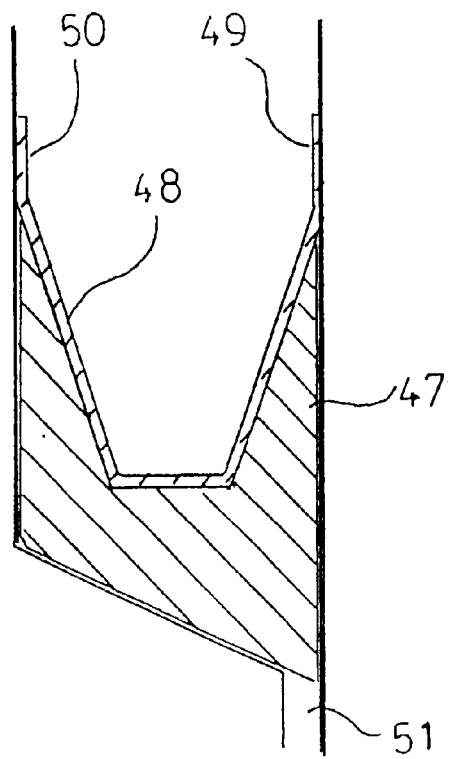
FIG. 10 shows yet a further composite sealing ring in accordance with the invention.

In FIG. 10 is a further composite seal seen in cross-section. A pressed metal seal part 48 with lips 49, 50, forms a primary seal. A machined support ring 47 adjoined thereto, is forced under pressure over extrusion gap 51 to form a secondary seal there over. The machined support ring 47 might be advantageously in bronze. This seal will be effective at temperatures to 400° C. and at high pressures.

Figure 11:
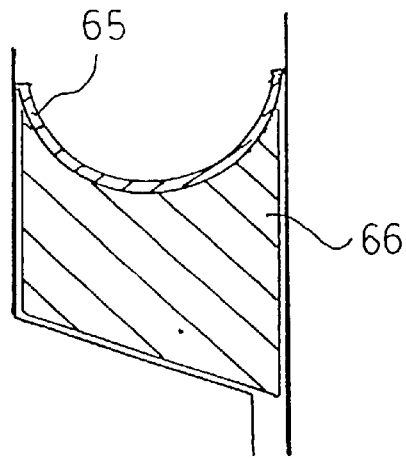
FIGS. 11 to 13 show cross-sectional details of further seals which might be used in accordance with the invention.

The seal of FIG. 11 uses a cup-shaped metal pressing 65 over a machined support ring 66.

Figure 12:
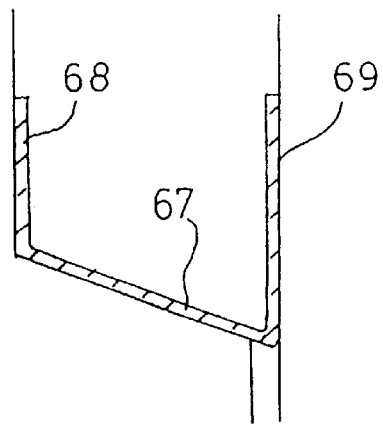
Figure 13:
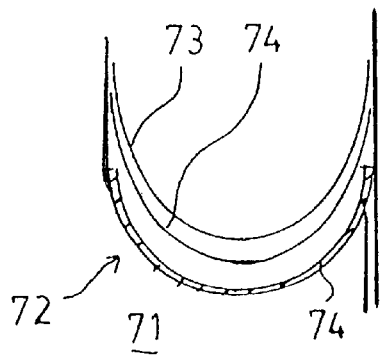

In FIG. 12, the cup-shaped metal pressing has flanges 68 and 69 for primary sealing and a sloped base 67 for the aforementioned secondary seal.

The seal of FIG. 13 uses one or more of a simpler metal pressing operating to seal a gap, as before between components 70 and 71 of an hydraulic assembly. The seals act over a complementary, generally concave shoulder 72. Two cup shaped seals 73, 74 are loaded over the shoulder (shown in their un-pressurised state). On application of pressure the first cup 73 achieves a primary seal. As the pressure rises the seals are compressed into the concavity 72 to adopt the shape indicated in bold and numbered 74. A spring effect in the seal achieves primary sealing at the edge of the seal at contact with component 70. A horizontal vector of the downward force expands the seat to form a secondary seal against the wall of component 70 and the lip of the seal groove on component 71.

The existing range of prior art seals for high temperature applications is somewhat limited. Seals to working temperatures of 300° C. are of prohibitive individual cost. A 5-stack hydraulic fastener of the Bunyan kind (see U.S. Pat. No. 4,864,798) would have 10 of these. Many applications are far beyond such operating range. With the present proposal, simple yet effective seals have been developed from readily available materials such as sheet metal, bronze and steel alloys. The seal of the prior art document U.S. Pat. No. 5,468,106 Percival-Smith is inadequate, being integrated with components of the hydraulic assembly and non replaceable. They do not have any primary sealing mechanism and they cannot be activated at low pressure. The number of operating cycles of such seals is limited, and component replacement cost is high.

A seal in accordance with one embodiment of the invention is shown (see below), fitted to a single chamber type hydraulic nut. When used in the configuration below (see FIG. 14), the invention allows use of simple seals, functioning at great pressures. Two rings are used and they are typically of bronze or nickel alloy. When pressure is introduced into the sealed cavity during charging, the thin lip portion of the seals in contact with the cylinder walls form a primary seal. However, as pressures increase, the metal seal is driven by a simple vector of the hydraulic force and geometry into the gap to bridge and seal the extrusion gap. In this seemingly simple arrangement, there are number of substantial benefits, not least being reasonable cost. When used at high temperatures, the bronze will anneal thereby solving problems of strain hardening which may otherwise occur with use. Other rings can be made from hardened steel, gunmetal, aluminium etc, depending upon the application. The essential principle lies in using a vector of the hydraulic force derived from the sloped shoulder to stretch the metal seal to form a metal to metal secondary seal during operation. The seals may be physically retained in place where necessary by retention means such as is used in some prior art seals.

Figure 14:
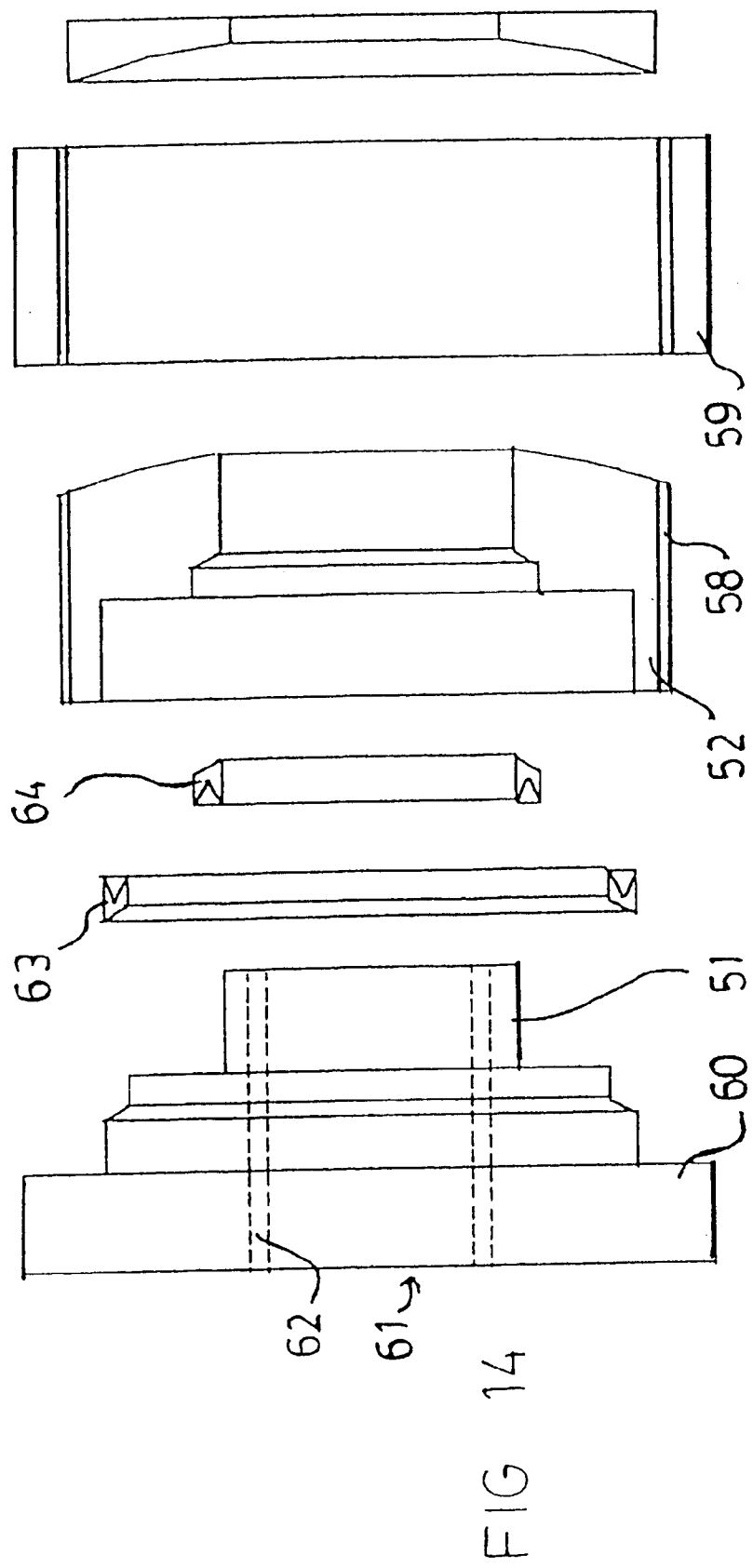
FIG. 14 is an exploded view of an hydraulic nut assembly, showing a system of seals to the expansion chamber of the nut, used in accordance with the invention.
Figure 15:
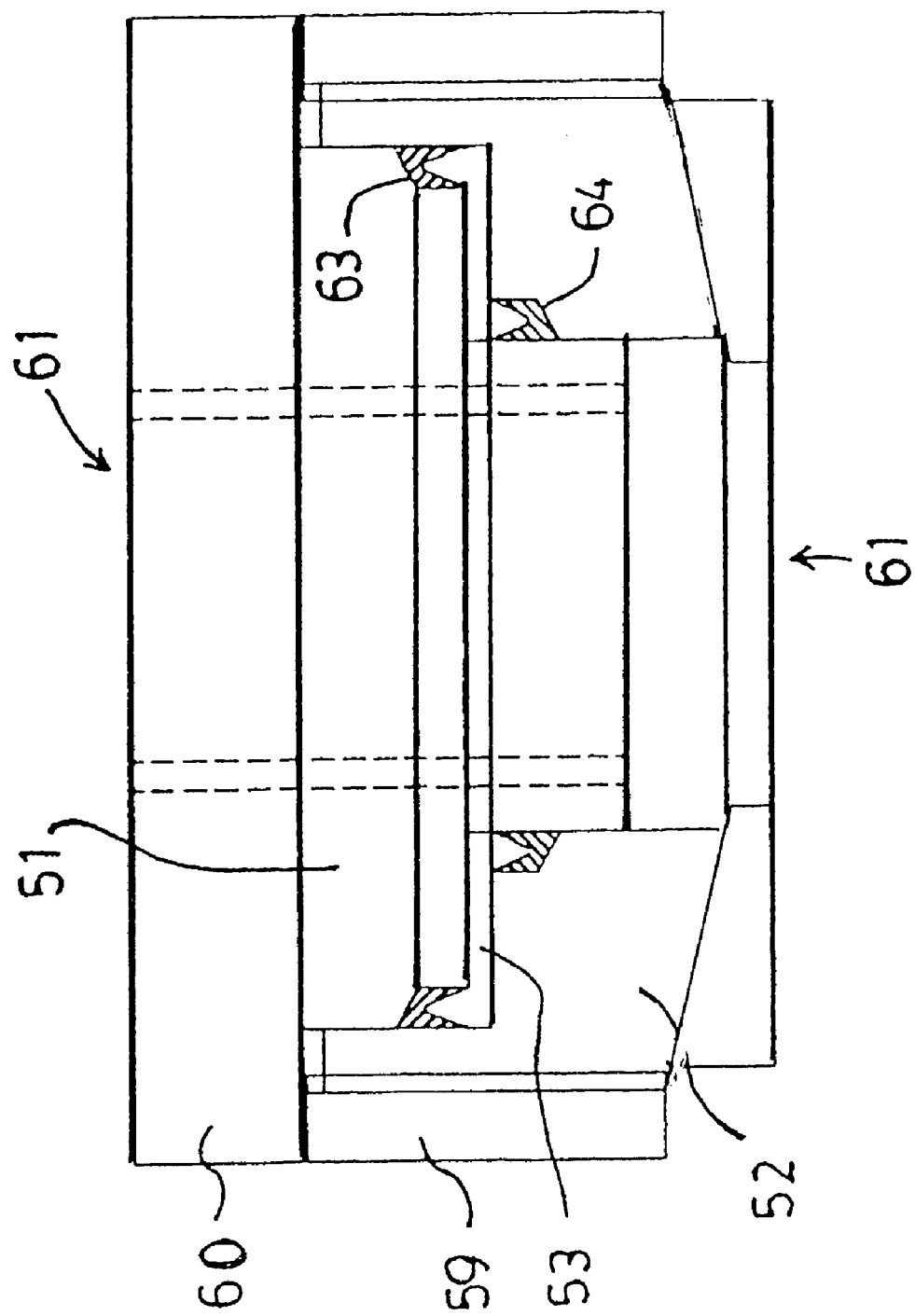
FIG. 15 shows the assembled nut of FIG. 14.

FIGS. 14 (expanded) and 15 (assembled) show a section through an hydraulic nut with piston 51 fitted into cylinder 52 forming chamber 53. When chamber 53 is charged with fluid under pressure (by any of the usual charging means) the piston is forced upwardly to expand the chamber. The locking ring 59 can be screwed upwardly on thread 58 against the flange 60 of the piston to hold the extension. In use, a bolt or stud (not shown) is projected through a central bore 61 to engage the nut thread 62. On extension of the nut, the bolt is tensioned with cylinder 52 abutted against that part being clamped between the nut and the support for the stud. This assembly is shown with 'metal only' seals 63, 64 which might be simply manufactured nickel alloy annular rings. Testing has shown that these nuts can typically withstand operating temperatures in excess of 650° C. and extreme pressures.

What is claimed is:

1. A seal for an hydraulic assembly for operation in a high temperature and/or pressure environment, wherein hydraulic fluid is to be contained under pressure in a working chamber formed between at least two parts of the assembly, against flow into a gap between said two parts, wherein said gap is defined between a first surface on one of said two parts and a second substantially parallel surface on a second of said two parts, said second part having a sloping surface extending away from said second surface to a third surface substantially parallel to the first and second surfaces, characterized in that:

the seal has a primary sealing mode wherein seal components are adapted to be in contact with said two parts of the assembly, operative to contain hydraulic fluid to a first pressure level; and a secondary sealing mode, established by elastic deformation of the seal at a pressure beyond said first pressure level, wherein the seal is adapted to closely associate with the gap, a portion of the seal being constructed of metal, and that portion being adapted to closely associate with the gap; wherein said seal comprises a seal body having outwardly projecting sealing flanges thereon that are adapted to contact respective first and third surfaces to effect a seal therewith in said primary scaling mode; and said seal body is adapted to elastically deform to slide along said sloping surface toward said first surface to effect the secondary sealing mode.

2. A seal as in claim 1, wherein:

the body of the seal is machined or forged in bronze or steel.

3. A seal as claimed in claim in 1, wherein:

a shell is superimposed on said seal body and extends divergently upwardly and outwardly from the body to form said scaling flanges.

4. A seal as claimed in claim 3, wherein:

the body of the seal is machined or forged in bronze or steel.

5. A seal as claimed in claim 3 wherein the body of the seal is machined or forged in bronze and the superimposed shell is pressed steel.

6. A seal as claimed in claim 1, wherein:

the seal comprises a pressed, cup-shaped form with flanges, said flanges operative to effect said primary sealing mode; and said seal being reactive to pressure to effect a seal in said secondary sealing mode.

7. A seal as claimed in claim 6, wherein:

said cup-shaped form is filled with a material resistant to crushing.

8. A seal as claimed in claim 7, wherein:

the crush resistant material is a ceramic material.

9. A seal as claimed in claim 1, wherein:

the seal comprises a pressed cup-shaped element having a sloped base; and said sloping surface of said second part is complemental to the sloped base of the seal, whereby pressure beyond said first pressure level causes said seal to deform and move along said sloping surface, developing a resolved force parallel to the sloping surface to create the secondary sealing mode.

10. A seal as claimed in claim 9, wherein:

the material of the seal and of the assembly part and the angle of slope of the sloping surface and the base, are selected so that friction between the sloped base and the complementally sloped surface is not so great as to adhere the base to the sloping surface before the seal can react in the secondary sealing mode.

11. A seal as claimed in claim 1, wherein:

said seal and said parts of the assembly are made of dissimilar metals to avoid fusing at extreme pressures.

12. An hydraulic assembly with a working chamber between a least two parts of the assembly, wherein the working chamber is sealed by at least one seal, said seal having a primary sealing mode, established by contact of seal components with said parts of the assembly, operative to contain hydraulic fluid to a first pressure level, and a secondary sealing mode, established by elastic deformation of the seal at a pressure beyond said first pressure level, to closely associate the seal with a gap, a portion of the seal being constructed of metal, and that portion being closely associated with the gap wherein:

said gap is defined between a first surface on one of said two parts and a second substantially parallel surface on the second of said two parts, said second part having a sloping surface extending away from said second surface to a third surface substantially parallel to the first and second surfaces, said seal comprises a seal body having outwardly projecting sealing flanges thereon that contact respective first and third surface to effect a seal therewith in said primary scaling mode, and said seal body is adapted to elastically deform to slide along said sloping surface toward said first surface to effect the secondary sealing mode.

13. An hydraulic assembly as claimed in claim 12, wherein: the assembly comprises a nut.

* * * * *